Sept. 9, 1958            W. GRAF            2,850,851
GEAR GRINDING MACHINES
Filed Feb. 17, 1953            4 Sheets-Sheet 1

Willi Graf
By Churchill, Rich, Waymouth & Engel
Attys.

Sept. 9, 1958  W. GRAF  2,850,851
GEAR GRINDING MACHINES
Filed Feb. 17, 1953  4 Sheets-Sheet 2

Willi Graf.
By Churchill, Rich, Weymouth & Engel
Attys.

Sept. 9, 1958      W. GRAF      2,850,851
GEAR GRINDING MACHINES

Filed Feb. 17, 1953      4 Sheets-Sheet 4

Willi Graf
By Churchill, Rich, Weymouth & Engel
Attys.

United States Patent Office 2,850,851
Patented Sept. 9, 1958

2,850,851

GEAR GRINDING MACHINES

Willi Graf, Zurich, Switzerland, assignor of one-half to Maag Gear-Wheel and Machine Company, Limited, Zurich, Switzerland, a body corporate of Switzerland Application February 17, 1953, Serial No. 337,350

18 Claims. (Cl. 51—123)

This invention relates to gear grinding machines of the kind in which the work piece is oscillated and rolled relative to the grinding wheel as it is being fed so that in grinding a tooth the locus of contact with the grinding wheel passes up and down the tooth from root to tip and back to form the desired contour, said oscillating movement being combined with a slow movement along the width of the tooth which is produced by the feed. The teeth to be ground may be of involute form and likewise along the width of the teeth the shape of the tooth is hereinafter referred to as "the regular form of the tooth," which includes straight and helical teeth. Such grinding machines will be referred to hereafter as being "of the kind described."

It is already known that the teeth of gear wheels when under load are momentarily distorted but due to their resilience return to normal when the load is removed, such distortion is hereinafter referred to as "resilient deformation." Such resilient deformation may be resolved in two directions, namely: firstly deformation in the direction along the width of the tooth or across the wheel which may be regarded as due to purely torsional forces and hereafter referred to as "torsional deformation", and secondly deformation in the direction tangentially to the gear wheel which can be regarded as due to the pressure on the teeth (hereinafter referred to as "bending deformation").

It is also known that it is advantageous to shape the teeth to provide for bending deformation so that the load is more evenly distributed over the tooth surface and excessive or uneven wear is avoided or reduced. In the case of a machine for the grinding of gear teeth of involute form, for example in which the gear wheel to be ground is oscillated and moved transversely simultaneously the two movements being related to produce a true involute tooth form, means have been provided in such machine to modify the relation between the oscillating and transverse movements so that the shape of the tooth is modified at the tip and root and caused to deviate to a desired extent from the true involute form. Such modification of the tooth form, however, only takes into account the bending deformation and no account is taken of resilient deformation along the tooth, i. e. across the length of the gear wheel which is produced by the torque being transmitted and which may be appreciable, especially in pinions having a considerable length relative to their diameter and transmitting heavy loads. In such cases those portions of the teeth which are adjacent to the end at which the drive is being applied have to bear more load than those at the remote end which reduces the efficiency and causes uneven wear.

It is also known to relieve the teeth over a part or parts of their length in order to provide for torsional deformation this being effected by a manual resetting of the work to regrind only such part or parts thus producing a departure from the true regular form along the width of the tooth.

One of the objects of the present invention is to provide in a gear grinding machine in which during grinding there is a relative oscillating movement between the workpiece and the grinding wheel automatic means for displacing said oscillating movement according to any desired predetermined amount so as to produce in the finished tooth a departure from the true regular tooth form along the width of the tooth in order to compensate for torsional deformation.

A further object of the invention is to enable such compensation for torsional deformation to be effected in a machine already provided with means for providing tip and root relief to compensate for bending deformation.

It is a still further object of the invention to enable both of the above mentioned objects to be effected whether the machine is adapted for the grinding of straight toothed gears or helical toothed gears.

Another object of the invention is to provide such compensations for torsional and/or bending deformation when grinding gear wheels with teeth of substantially involute form.

Other objects of the invention will appear from the following description.

According to the present invention in a gear grinding machine of the kind described for grinding straight and/or helical toothed gears, means are provided for displacing the said oscillation as the feed progresses so as to produce a departure from the tooth form along the whole or any part of the width of the tooth in order to compensate for resilient torsional deformation due to torsional strain when under load. In the case of a straight toothed gear wheel the result of the modification is to produce a slight helical formation which may extend along the whole tooth width or along part or parts of the tooth width as desired. In the case of a helical gear wheel the effect is to modify the helix by increasing or reducing the angle of the helix along the whole or along part or parts of the tooth width as desired.

In order to enable the invention to be readily carried into effect and to explain other features thereof, one embodiment will be described in which means are provided for modifying the true involute form of tooth of a gear wheel to compensate for both torsional and bending deformation.

Referring to the drawings filed herewith:

Fig. 9 shows a cam disc for producing adjacent the tip and root of such deviations from the involute tooth profile.

The gear grinder in the present embodiment of the invention is designed for providing deviation along the tooth to compensate for the resilient deformation due to torsional stresses and for providing deviation from the involute form at the tip and root of each tooth to compensate for resilient deformation or bending under load. The gear grinder is suitable for finish-grinding either straight or helical teeth of gear wheels or gear generating cutters of the pinion type, the teeth of which have been previously cut, for example by the hobbing or planing process. In the present example the machine is shown grinding a gear wheel.

Figure 1:
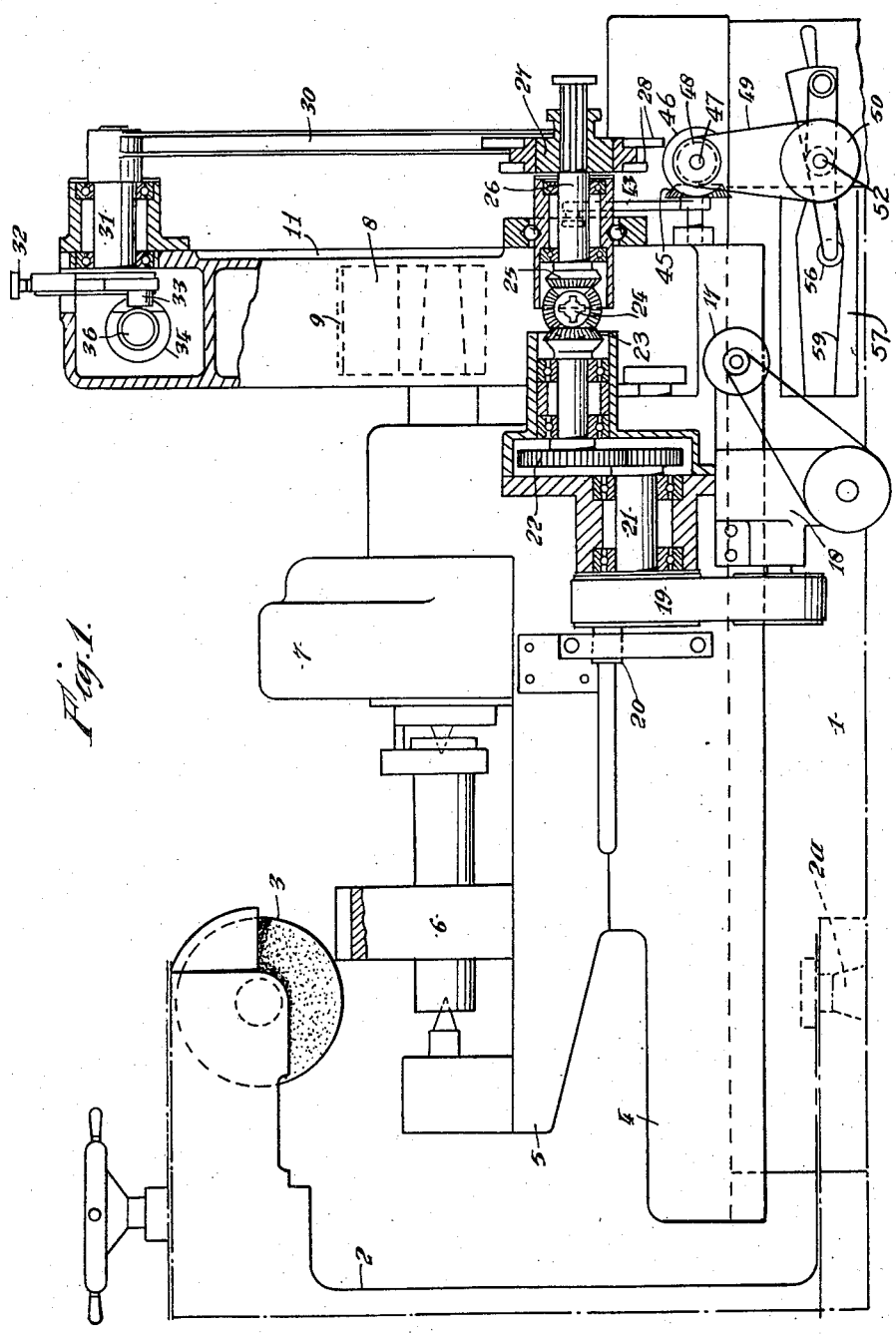
Fig. 1 is a part-sectional side elevation of the gear grinder.

As shown in Fig. 1, the machine comprises a bed 1 upon which is mounted a column 2 adapted to be turned about a vertical pivot 2a and to be secured in any desired position. The column 2 carries the holder for the rotary grinding tools 3 of which there are two in the present embodiment for a purpose which will hereinafter be apparent. Also mounted on the bed 1 and displaceable longitudinally thereof is a slide 4, for feeding the work relative to the tool. A traversing slide 5 is mounted on the feed slide 4 and is adapted to be reciprocated thereon transversely of the machine. The traversing slide carries between centres the gear wheel 6 to be ground. The latter is connected through a dividing or indexing device encased in a housing 7 by a shaft (not shown) to a part-cylindrical rolling body 8, which is rotatably mounted on a spindle co-axial with the gear wheel 6 and is adapted to rotate the latter. Details of the dividing mechanism contained in the house 7 are not shown or described, and being of known construction and operation it is therefore not relevant to the present invention. Its function is of course to rotate the work by the circular pitch of one tooth when the grinding of one tooth has been completed and that of another tooth is to be begun.

Figure 2:
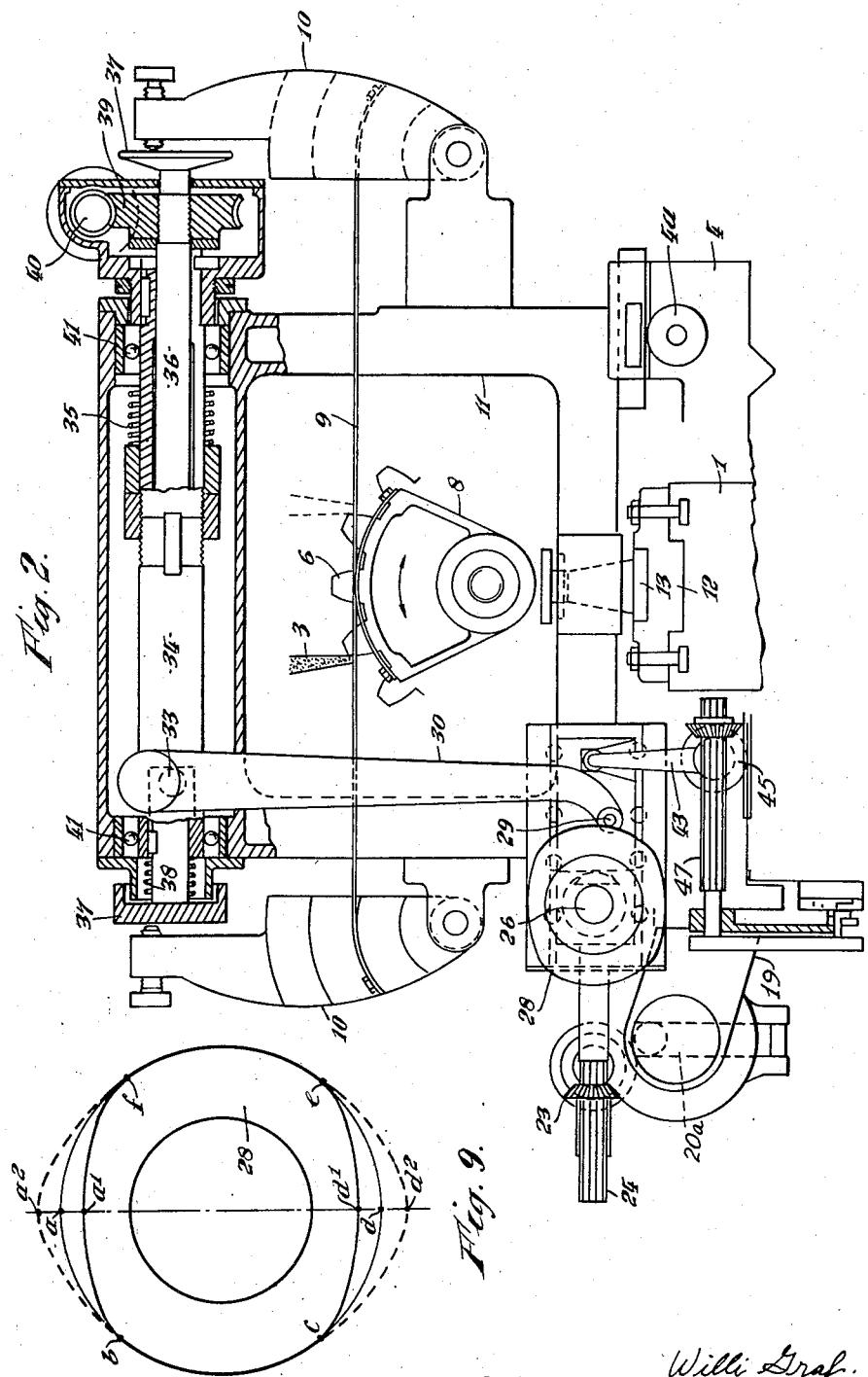
Fig. 2 is a part-sectional end elevation of part of the machine showing the elements for producing the rolling motion.

As shown in Fig. 2, the rolling body 8 has flexible steel tapes 9 which pass partly round its circumference. One end of each tape is secured to the body 8 whilst their other ends are secured by screws to a tape holder which in the present embodiment consists of two arms 10, between which and the body 8 the steel tapes are held in tension. The arms 10 are each pivotally connected at their lower end to the frame 11. As will be seen hereinafter, pivotal movement of the arms 10 is produced by cam means and is required for producing the desired deviations from the involute form of the tooth profile, and the arms are moved in unison for this purpose, but at other times they remain stationary. The frame 11 is mounted on the lower or feed slide 4 and is movable transversely thereof being mounted on rollers 4a for this purpose. Such transverse movement, which as will be seen is normally required only when gear wheels with helical teeth are being ground, is brought about by a guide 12. The guide 12 is adjustably mounted on the machine bed 1, having a groove engaged by a slide member 13 carried by a pin in the underside of the frame 11.

Figure 3:
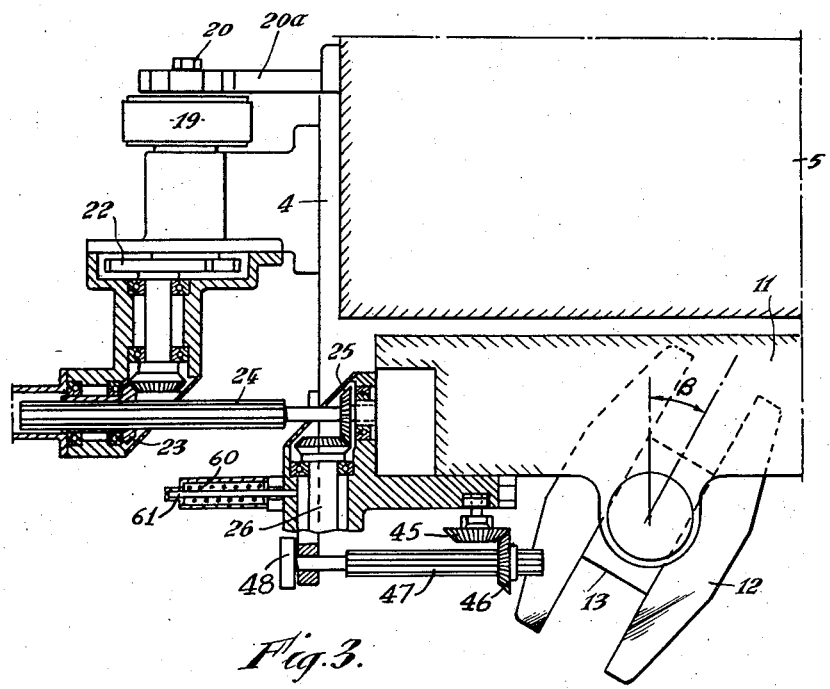
Fig. 3 is a part-sectional top plan of that part of the machine shown in Fig. 2.

The drive for the parts of the machine so far described is provided for in the following manner, which is shown in Figs. 1 and 3. The slide 5 is reciprocated on the feed slide 4 by the following mechanism. A motor 17 mounted on the slide 4 drives a worm gearing in the casing 18, a belt 19 and crank pin 20 carried on the crankshaft 21, the crank pin 20 being engaged in a vertical slot in the arm 20a secured to the slide 5 and causes the latter together with the work 6, the dividing mechanism 7 and the rolling body 8 to be rapidly reciprocated back and forth upon the lower slide 4. Each revolution of the crank produces a complete back and forth traverse of the upper slide 5. This reciprocation or rocking and sliding movement causes the cutter which is in action to make contact with the tooth on a surface which will produce a true involute tooth form unless modified. The mechanism for modifying the tooth form to compensate for bending deformation will now be described. The crank shaft 21 also drives gear wheels 22 and through the latter a bevel gearing 23 which in turn rotates a splined shaft 24 coupled through a bevel gearing 25 to a cam shaft 26. Slidably mounted on the outer extremity of the shaft 26 is a hub 27 which is keyed on the shaft and which carries two cam discs 28. As will be apparent hereinafter, one of these cams 28 is used when grinding one flank of a tooth and the other when grinding the opposite flank, so that only one of these cams is in use at a time. The hub 27 can be displaced upon the shaft 26 so that the roller cam follower 29 can be brought into engagement with whichever cam happens to be required. The cams 28 constitute the cam means referred to in the foregoing and the manner in which they cause pivotal movement of the tape holder arms 10 will now be described wtih particular reference to Figs. 1 and 2.

The cam roller 29 is carried on the end of a lever 30 which is pivoted in the frame 11. Its pivot pin 31 (Fig. 1) carries at its free end a coupling member 33 which is eccentric with respect to the axis of the pivot, the degree of eccentricity of which can be adjusted by means of a screw 32. The coupling member 33 therefore moves in unison with the lever 30, and the device 30, 31, and 33 acts as a two armed lever. The coupling member 33 is engaged in a recess provided in a sleeve 34 which is mounted for axial sliding movement in the frame 11, and is urged into engagement with the coupling member 33 by a spring 35 supported between a part of the frame 11 and a collar on the sleeve 34. Extending through and keyed to the sleeve 34 is a shaft 36, the ends of which project from the frame 11, and carry plates 37 upon which the tape holder arms 10 abut. The shaft 36 is threaded near one end thereof, and the threaded portion has mounted thereon a nut 39 which takes the form of a worm-wheel and is engaged by a worm 40. The worm gearing 39 and 40 is encased in an extension of the sleeve 34. A spring 38 urges the shaft 36 to the left (Fig. 2) with respect to the sleeve 34 so that the worm wheel 39 is held against an axial thrust bearing provided at the adjacent end of the sleeve 34. The object of the worm gearing 39, 40 is to enable the tape holder arms 10 to be initially adjusted before the grinding operation commences. Manual rotation of the worm 40 causes the shaft 36 to be slightly displaced longitudinally within the sleeve 34. This pivots the tape holder arms 10 and rotates the rolling body 8 to move the flank of the gear tooth being ground into contact with the appropriate grinding wheel 3. The sleeve 34 is mounted for axial displacement on the frame 11 by means of ball bearings 41. When the machine is in operation, the axial movement imparted to the sleeve by the coupling member 33 are transmitted to the shaft 36 which rocks the arms 10 accordingly.

Figure 5:
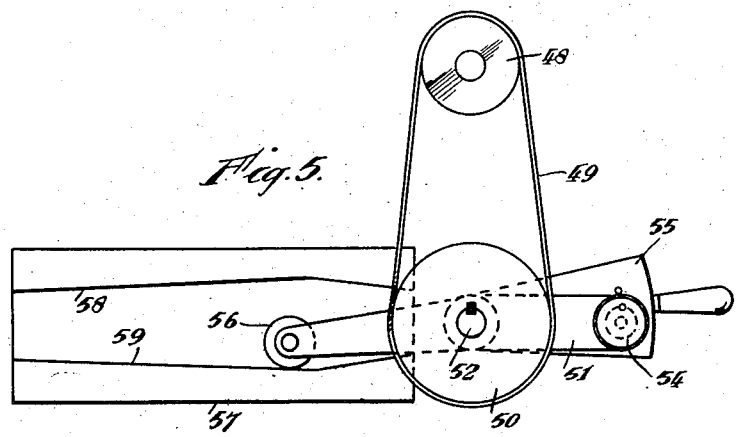
Figs. 5 and 6 are views of the cam and feelers with operating device according to Fig. 4.
Figure 4:
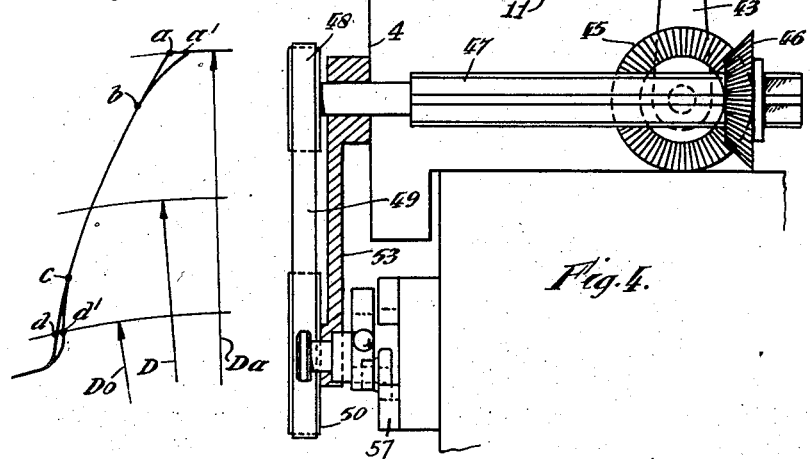
Fig. 4 is an end elevation of the device for the partly setting back of the tooth profile along the tooth breadth.
Figure 6:
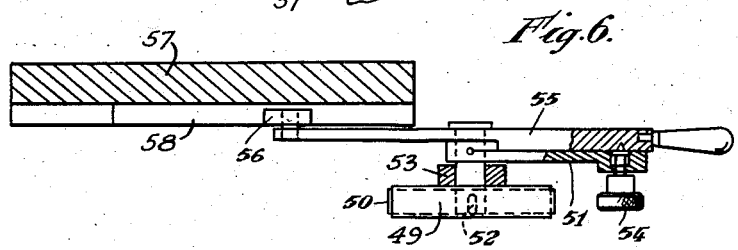
Figure 7:
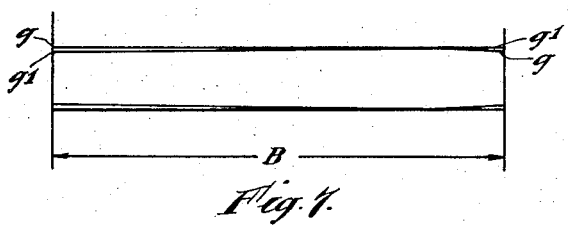
Fig. 7 is a schematic view of one tooth with set back tooth flank lengthwise of the tooth breadth.

The machine shown in the drawings is also designed to be used for modifying the tooth form to compensate for torsional deformation by setting back at certain points of the tooth flanks along their breadth B, which setting back can be carried out with or without compensation for bending deformation. In Fig. 7 the tooth form has been set back from $g$ to $g'$. The mechanism for effecting this setting back will now be described. The shaft 26 with a bevel gear 25 and cam discs 28 is mounted on a slide 42 (Fig. 4) which in its turn is slidably mounted in the frame 11. A lever 43 which is pivoted in the frame 11 engages in a recess 44 in the slide 42. The lever 43 is connected with a bevel wheel 45 which meshes with a bevel wheel 46, slidable along the shaft 47, which is mounted on the lower slide 4 and carries a disc 48, which is connected by a tape 49 with the disc 50. (Figs. 4, 5 and 6.) A lever 51 is fastened to the shaft 52 of the disc 50 held by a bracket 53 secured to the slide 4. The lever 51 is provided with an adjusting device 54, which can engage in notches of a lever 55, pivoted on the shaft 52. The free end of the lever 55 is provided with a roller 56, the latter rolling on a curved cam surface 57 secured to the bed 1, said movement taking place as the slide 4 is moved. By means of the lever 55, the roller 56 can be brought into contact with either the upper or the lower of the two curved surfaces 58 and 59. By means of a spring 60 which is connected by the rod 61 with the slide 42, the transmission members 43 to 56 can be brought under pressure and their play overcome.

The operation of the machine will first of all be described in connection with the grinding of straight teeth.

Figure 8:
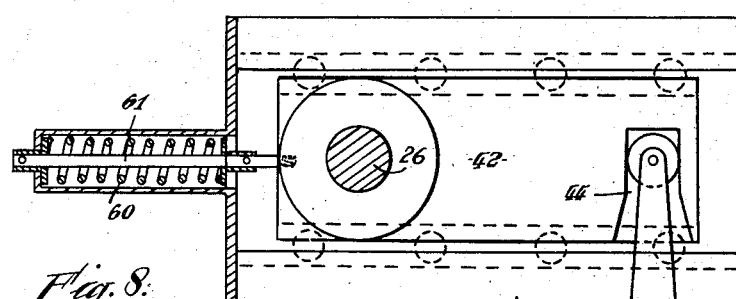
Fig. 8 is a diagrammatic representation of a tooth profile showing the deviations from the involute form at parts of the tooth flank.

For this purpose the column 2 is swung on its pivot 2a so that the grinding wheel faces are parallel to the axis of the work. Also the guide 12 is adjusted so that the angle β (Fig. 3) is zero. The frame 11 therefore makes no transverse movement but is fed forward by the lower slide 4 in a direction parallel to the axis of the work. As the lower slide 4 is fed forward the upper slide 5 is rapidly reciprocated transversely of the lower slide 4, so that a very large number of reciprocations occur in the time that the lower slide has moved forward by an amount equal to the width of the tooth being ground. Each reciprocation of the slide 5 causes the body 8 to roll along the steel tapes 9 which will be assumed to be stationary for the moment. The diameter of the rolling body 8 is equal to the base circle $D_0$ of the tooth (Fig. 8). The resulting rotation of the body 8 is imparted to the work and, combined with the transversing motion thereof moves a tooth flank across the grinding wheel edges so that the latter grind the tooth flank to involute form. It is also the same narrow rim of the grinding wheel face which is in contact with the tooth flank and which constitutes the grinding edge (see Fig. 2). It is however desired that the portions of the tooth flank adjacent to the tip and root are to be relieved so as to deviate from the involute form as shown in Fig. 8. The part of the flank in the region of the pitch circle (with diameter D), namely the part from point b—c is to be of true involute form, whilst the tip relief begins at b and increases till it reaches the amount a—a' at the tip circle (diameter $D_a$). The root relief begins at c and continues to the point d' on the base circle (diameter $D_0$) below which the involute form is not in any case produced. The amounts of relief a—a' and d—d' have been purposely exaggerated in Fig. 8 for greater clearness. They correspond to the flattened portions a—a' and d—d' of the operative face of the cam disc 28 shown in Fig. 9. In order for the part b—c of the tooth flank to be of true involute form, the tape holder arms 10 must remain stationary while this part is being ground. For this reason the cam face c—b (Fig. 9) is cylindrical and concentric with the cam axis so that the cam does not move the lever 30. When the narrow grinding wheel rim reaches the point b of the tooth flank at which the tip relief is to begin, then it is necessary for the gear wheel 6 to receive a gradual increasing additional rotation to the left as viewed in Fig. 2 (assuming that the grinding of a left-hand tooth flank is being considered, i. e. by the left hand grinding wheel 3 shown in Fig. 2). Accordingly the cam face begins to be flattened at point b (Fig. 9) the degree of flattening reaching its maximum at point a' so that the lever 30 urged by the spring 35, follows this cam contour and swings a little to the left. The sleeve 34, shaft 36, arms 10 and tapes 9 all executing similar movements to the left, whereby the rotation of the rolling body 8 and of the work 6 is temporarily accelerated. The work 6 moves further to the left by the time the cam roller is in contact with the point a' of the cam than would have been done but for this flattened contour of the cam. When the cam roller 29 is riding on the point a' of the face, the grinding wheel rim has reached the tip circle point a' of the tooth profile. The reciprocation of the traversing slide 5 is now reversed so that the grinding wheel works back along the tooth flank portion a'—b but the cam 28 continues to rotate without change of direction and the cam face portion a'—f (Fig. 9) is now operative. The gradually decreasing degree of flattening thereof finds expression in the lessening of the amount of relief from the point a' back to the point b of the tooth flank. From f to e the cam face is circular again, and the tape holder remains stationary while the grinding wheel works once more on the involute flank portion b—c. The flattened cam face e—d'—c in a similar manner produces root relief c—d' (Fig. 8).

When one left hand tooth flank is completely finished, the dividing or indexing mechanism encased in the housing 7 causes the work to be rotated to present another left hand tooth flank to the grinding wheel and so forth. When the left hand flanks of all the teeth have been ground the mechanism is adjusted for grinding all the right hand flanks in succession. For this purpose the cam roller 29 is disengaged from its cam and the hub 27 displaced on the shaft 26, until the cam roller can be engaged with the other cam 28. The latter has instead of the flattened portions of its companion, raised portions as indicated in the dotted lines in Fig. 9, which deviate from the circular form of the portion b—c and e—f by the amounts a—$a^2$ and d—$d^2$.

These raised cam face portions b—$a^2$—f and e—$d^2$—c produce small deflections of lever 30 and sleeve 34 to the right (as viewed in Fig. 2) against the pressure of the spring 35, and as will be appreciated this produces in like manner as already described above, the additional necessary rotation of the work to the right. As can be seen, in order to remove the extra amount of material near the tip and root of the right hand tooth flank which in Fig. 2 is shown as being worked upon by the right hand one of the two grinding wheels, only one of the two grinding wheels is in operation at a time, one being for the purpose of grinding the left hand flanks and the other the right hand flanks of all the teeth. The grinding wheels are adjustable and, as will be seen in Fig. 2, the wheel which is not in use (right hand one) is set back a little to clear the adjacent (right hand) tooth flank so as not to operate thereon.

The operation of the machine when grinding gear wheels with helical teeth is substantially the same, the only difference being that column 2 is turned on its pivot 2a to set the faces of the grinding wheels at an angle with the axis of the work equal to the desired helix angle β, and that the guide 12 is likewise adjusted to form this angle β with the direction of the feed of the lower slide 4. Fig. 2 shows the apparatus set to this position so that as the frame moves forward with the lower slide, it is also displaced laterally and while advancing towards the grinding wheels moves progressively further away from the axis of the work. This of course imparts the same lateral movement to the steel tapes 9 and the effect, as will be apparent, is progressively to displace the arc through which the rolling body 8 and the work oscillate along its own curvature. In this way the work is gradually turned along a helical path of helix angle β as it is fed forward into the grinding wheel, the operative rim of the latter thus grinding the tooth to helical form with respect to the axis of the work. The lateral movement of the frame does not affect the drive of the cam 28 mounted thereon because the splined shaft 24 slides within the associated bevel wheel of gearing 23.

Notwithstanding this lateral displacement of the frame therefore, the removal of extra material to provide tip and root relief begins at b and c respectively of the tooth profile as shown in Fig. 8 and proceeds to the same points a' and d', since the cam continues to operate in the same timed relationship to the rolling oscillations of the work wherever the arc of oscillation may be situated in the course of the forward feed.

The operation of that part of the machine which carries out the setting back of tooth flanks at certain points along the tooth breadth to compensate for torsional deformation under load is as follows. By reason of the feeding movement of the lower slide 4, the roller 56 of the lever 55 moves along one of the curved cam surfaces 58 or 59, thus imparting a slight turning movement to the disc 50. This movement is transferred over the members 49 to 43 to the slide 42 on which is mounted the shaft 26 of the cam discs 28. The lever 30 is thus swung further by reason of the rectilinear movement of the cam discs which in its turn is translated into an additional turning movement of the toothed wheel 6, the latter causing a setting back of the tooth flanks at certain points along the tooth breadth from g to g' (Fig. 7) in accordance with the flexure of the tooth wheel body under load. In the same manner when rounding off the profile, the left and right hand flanks of the tooth are treated not simultaneously but successively. For this reason the guiding member 57 is provided with separate curved cam surfaces 58 and 59 respectively for each side of the tooth.

If it is desired to provide compensation for torsional deformation alone the cam 28 is replaced by a circular disc so that rotation of the shaft 26 produces no displacement of the arm 30 whilst at the same time displacement of the slide 42 and shaft 26 will continue to provide compensation for torsional deformation.

In like manner it will be obvious that by providing a straight guide for the roller 56 or by locking the slide 42 against movement the compensation for torsional deformation will not take place whilst permitting tip and root relief to be produced.

The mechanism for providing the tip and root relief and set back can both be rendered inoperative if desired, for example, for rough grinding the tooth flanks, in which case the root and tip portions would be relieved and set back imparted in a subsequent finish grinding operation. In order to render the mechanism inoperative, the lever 30 is disengaged from the cam 28 and secured in such disengaged position. The two grinding wheels can in that case be used simultaneously, both being adjusted into operative contact with their respective tooth flanks.

What I claim and desire to secure by Letters Patent is:

1. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from tip to root and back, means for simultaneously feeding the work piece relative to the grinding wheel to cause the locus of contact aforementioned to pass gradually along the width of a straight tooth and automatic means operatively associated with said oscillating movement producing means for displacing the limits of said oscillating movement relative to the work piece as the feed progresses so as to produce a predetermined departure from the straight tooth form along at least part of the width of the tooth.

2. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from tip to root and back, means operatively associated with said oscillating movement producing means for modifying said oscillating movement to produce a predetermined departure from the tooth form along at least part of the tooth between the root and tip, means for simultaneously feeding the work piece relative to the grinding wheel to cause the locus of contact aforementioned to pass gradually along the width of a straight tooth and automatic means for displacing the limits of said oscillating movement relative to the work piece as the feed progresses to as to produce a predetermined departure from the straight tooth form along at least part of the width of the tooth.

3. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from tip to root and back, means for simultaneously feeding the work piece relative to the grinding wheel and operatively associated with said oscillating movement producing means for progressively displacing the limits of said oscillating movement relative to the work piece as the feed progresses to cause the locus of contact aforementioned to pass gradually along the width of a helical tooth and automatic means for modifying the displacement of the said limits of the oscillating movement as the feed progresses so as to produce a predetermined departure from the helical tooth form along at least part of the width of the tooth.

4. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from tip to root and back, means operatively associated with said oscillating movement producing means for modifying said oscillating movement to produce a predetermined departure from tooth form along at least part of the tooth between the root and tip, means for simultaneously feeding the work piece relative to the grinding wheel and for progressively displacing the limits of said oscillating movement relative to the work piece as the feed progresses to cause the locus of contact aforementioned to pass gradually along the width of a helical tooth and automatic means for modifying the displacement of the said limits of the oscillating movement as the feed progresses so as to produce a predetermined set back from the helical tooth form along at least part of the width of the tooth.

5. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from tip to root and back, rounding off means comprising cam means and transmission mechanism operatively associated with said means for producing said oscillating movement for modifying said oscillating movement to produce a predetermined relieving departure from the tooth form along at least part of the tooth between the root and tip, means for simultaneously feeding the work piece relative to the grinding wheel to cause the locus of contact aforementioned to pass gradually along the width of a straight tooth and automatic means operatively associated with said cam means for moving said cam means and displacing the limits of said oscillating movement relative to the work piece as the feed progresses so as to produce a predetermined setting back departure from the straight tooth form along at least part of the width of the tooth.

6. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from tip to root and back, rounding off means comprising cam means and transmission mechanism operatively associated with the means for producing said oscillating movement for modifying said oscillating movement to produce a predetermined departure from the tooth form along at least part of the tooth between the root and tip, means for simultaneously feeding the work piece relative to the grinding wheel, means operatively associated with said oscillating movement producing means for progressively displacing the limits of said oscillating movement relative to the work piece as the feed progresses to cause the locus of contact aforementioned to pass gradually along the width of a helical tooth and automatic means operatively associated with said rounding off means for modifying the displacement of the oscillating movement relative to the work piece as the feed progresses so as to produce a predetermined setting back departure from the helical tooth form along at least part of the width of the tooth.

7. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from root to tip and back, rounding off means comprising movably mounted cam means and transmission mechanism operatively associated with said means for producing said oscillating movement for modifying said oscillating movement to produce a predetermined relieving departure from the tooth form along at least part of the tooth between the root and tip, means for simultaneously feeding the work piece relative to the grinding wheel to cause the locus of contact aforementioned to pass gradually along the width of a straight tooth, a cam guide having two selectable guide surfaces for use in machining the left and right side tooth flanks respectively and a feeler member selectively operatively associated with one of said guide surfaces said feeler being operatively associated with said cam means for automatically moving said cam means and displacing the limits of said oscillating movement relative to the work piece as the feed progresses so as to produce a predetermined setting back departure from the straight tooth form along at least part of the width of the tooth.

8. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from root to tip and back, rounding off means comprising movably mounted cam means and transmission mechanism operatively associated with said means for producing said oscillating movement for modifying said oscillating movement to produce a predetermined relieving departure from the tooth form along at least part of the tooth between the root and tip, means for simultaneously feeding the work piece relative to the grinding wheel, means operatively associated with said oscillating movement producing means for progressively displacing the limits of said oscillating movement relative to the work piece as the feed progresses to cause the locus of contact aforementioned to pass gradually along the width of a helical tooth, a cam guide having two selectable guide surfaces for use in machining the left and right side tooth flanks respectively and a feeler member selectively operatively associated with one of said guide surfaces said feeler being operatively associated with said cam means for moving said cam means and displacing the limits of said oscillating movement relative to the work piece as the feed progresses so as to produce automatically a predetermined setting back departure from the helical tooth form along at least part of the width of the tooth.

9. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from root to tip and back, rounding off means comprising a camshaft mounted in a movable slide said camshaft having two selectable cams for use in machining the left and right side tooth flanks respectively and a cam follower selectively operatively associated with one of said cams said cam follower being coupled by transmission mechanism to the oscillating movement producing means for modifying said oscillating movement to produce a predetermined relieving departure at the root and tip of said tooth flank, means for simultaneously feeding the work piece relative to the grinding wheel to cause the locus of contact aforementioned to pass gradually along the width of a straight tooth a cam guide having two selectable guide surfaces for use in machining the left and right side tooth flanks respectively and a feeler member selectively operatively associated with one of said guide surfaces said feeler being operatively associated with said movable slide for moving said camshaft and displacing the limits of said oscillating movement relative to the work piece as the feed progresses so as to produce automatically a predetermined setting back departure from the straight tooth form along at least part of the width of the tooth.

10. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from root to tip and back, rounding off means comprising a camshaft mounted in a movable slide said camshaft having two selectable cams for use in machining the left and right side tooth flanks respectively and a cam follower selectively operatively associated with one of said cams said cam follower being coupled by transmission mechanism to the oscillating movement producing means for modifying said oscillating movement to produce a predetermined relieving departure at the root and tip of said tooth flank, means for simultaneously feeding the work piece relative to the grinding wheel, means operatively associated with said oscillating movement producing means for progressively displacing the limits of said oscillating movement relative to the work piece as the feed progresses to cause the locus of contact aforementioned to pass gradually along the width of a helical tooth a cam guide having two selectable guide surfaces for use in machining the left and right side tooth flanks respectively and a feeler member selectively operatively associated with one of said guide surfaces said feeler being operatively associated with said movable slide for moving said camshaft and displacing the limits of said oscillating movement relative to the work piece as the feed progresses so as to produce automatically a predetermined setting back departure from the helical tooth form along at least part of the width of the tooth.

11. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from root to tip and back, rounding off means comprising a camshaft mounted in a movable slide said camshaft having two selectable cams for use in machining the left and right side tooth flanks respectively and a cam follower selectively operatively associated with one of said cams said cam follower being coupled by transmission mechanism to the oscillating movement producing means for modifying said oscillating movement to produce a predetermined relieving departure at the root and tip of said tooth flank, means for simultaneously feeding the work piece relative to the grinding wheel to cause the locus of contact aforementioned to pass gradually along the width of a straight tooth, a cam guide having two selectable guide surfaces for use in machining the left and right side tooth flanks respectively and a feeler member provided with change over mechanism for bringing said feeler member into operative association with one of said guide surfaces and transmission means including a belt drive operatively associated between said feeler member and said movable slide for moving said camshaft and displacing the limits of said oscillating movement relative to the work piece as the feed progresses so as to produce automatically a predetermined setting back departure from the straight tooth form along at least part of the width of the tooth.

12. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from root to tip and back, rounding off means comprising a camshaft mounted in a movable slide said camshaft having two selectable cams for use in machining the left and right side tooth flanks respectively and a cam follower selectively operatively associated with one of said cams said cam follower being coupled by transmission mechanism to the oscillating movement producing means for modifying said oscillating movement to produce a predetermined relieving departure at the root and tip of said tooth flank, means for simultaneously feeding the work piece relative to the grinding wheel, means operatively associated with said oscillating movement producing means for progressively displacing the limits of said oscillating movement relative to the work piece as the feed progresses to cause the locus of contact aforementioned to pass gradually along the width of a helical tooth, a cam guide having two selectable guide surfaces for use in machining the left and right side tooth flanks respectively and a feeler member provided with change over mechanism for bringing said feeler member into operative association with one of said guide surfaces and transmission means including a belt drive operatively associated between said feeler member and said movable slide for moving said camshaft and displacing the limits of said oscillating movement relative to the work piece as the feed progresses so as to produce automatically a predetermined setting back departure from the helical tooth form along at least part of the width of the tooth.

13. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from root to tip and back, rounding off means comprising a camshaft mounted in a movable slide said camshaft having two selectable cams for use in machining the left and right side tooth flanks respectively and a cam follower selectively operatively associated with one of said cams said cam follower being coupled by transmission mechanism to the oscillating movement producing means for modifying said oscillating movement to produce a predetermined relieving departure at the root and tip of said tooth flank, means for simultaneously feeding the work piece relative to the grinding wheel to cause the locus of contact aforementioned to pass gradually along the width of a straight tooth, a cam guide having two selectable guide surfaces for use in machining the left and right side tooth flanks respectively a feeler member selectively operatively associated with one of said guide surfaces said feeler being operatively associated with said movable slide for moving said camshaft and displacing the limits of said oscillating movement relative to the work piece as the feed progresses so as to produce automatically a predetermined setting back departure from the straight tooth form along at least part of the width of the tooth and spring means operatively associated with said slide to maintain said feeler in contact with the selected guide surface.

14. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from root to tip and back, rounding off means comprising a camshaft mounted in a movable slide said camshaft having two selectable cams for use in machining the left and right side tooth flanks respectively and a cam follower selectively operatively associated with one of said cams said cam follower being coupled by transmission mechanism to the oscillating movement producing means for modifying said oscillating movement to producing a predetermined relieving departure at the root and tip of said tooth flank, means for simultaneously feeding the work piece relative to the grinding wheel, means operatively associated with said oscillating movement producing means for progressively displacing the limits of said oscillating movement relative to the work piece as the feed progresses to cause the locus of contact aforementioned to pass gradually along the width of a helical tooth a cam guide having two selectable guide surfaces for use in machining the left and right side tooth flanks respectively, a feeler member selectively operatively associated with one of said guide surfaces said feeler being operatively associated with said movable slide for moving said camshaft and displacing the limits of said oscillating movement relative to the work piece as the feed progresses so as to produce automatically a predetermined setting back departure from the helical tooth form along at least part of the width of the tooth and spring means operatively associated with said slide to maintain said feeler in contact with the selected guide surface.

15. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from root to tip and back, rounding off means comprising a camshaft mounted in a movable slide said camshaft having two selectable cams for use in machining the left and right side tooth flanks respectively and a cam follower selectively operatively associated with one of said cams said cam follower being coupled by transmission mechanism to the oscillating movement producing means for modifying said oscillating movement to produce a predetermined relieving departure at the root and tip of said tooth flank, means for simultaneously feeding the work piece relative to the grinding wheel to cause the locus of contact aforementioned to pass gradually along the width of a straight tooth, a cam guide having two selectable guide surfaces for use in machining the left and right side tooth flanks respectively, a feeler member provided with change over mechanism for bringing said feeler member into operative association with one of said guide surfaces and transmission means including a belt drive operatively associated between said feeler member and said movable slide for moving said camshaft and displacing the limits of said oscillating movement relative to the work piece as the feed progresses so as to produce automatically a predetermined setting back departure from the straight tooth form along at least part of the width of the tooth and spring means operatively associated with said slide to maintain said feeler in contact with the selected guide surface.

16. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from root to tip and back, rounding off means comprising a camshaft mounted in a movable slide said camshaft having two selectable cams for use in machining the left and right side tooth flanks respectively and a cam follower selectively operatively associated with one of said cams said cam follower being coupled by transmission mechanism to the oscillating movement producing means for modifying said oscillating movement to produce a predetermined relieving departure at the root and tip of said tooth flank, means for simultaneously feeding the work piece relative to the grinding wheel means operatively associated with said oscillating movement producing means for progressively displacing the limits of said oscillating movement relative to the work piece as the feed progresses to cause the locus of contact aforementioned to pass gradually along the width of a helical tooth, a cam guide having two selectable guide surfaces for use in machining the left and right side tooth flanks respectively, a feeler member provided with change over mechanism for bringing said feeler member into operative association with one of said guide surfaces and transmission means including a belt drive operatively associated between said feeler member and said movable slide for moving said camshaft and displacing the limits of said oscillating movement relative to the work piece as the feed progresses so as to produce automatically a predetermined setting back departure from the helical tooth form along at least part of the width of the tooth and spring means operatively associated with said slide to maintain said feeler in contact with the selected guide surface.

17. In a gear grinding machine, means for supporting a toothed work piece, a grinding wheel having a side grinding face, means for producing between limits a relative oscillating and rolling movement between the work piece and the side face of the grinding wheel to cause the locus of contact between the work piece and the grinding wheel to pass repeatedly up and down the tooth flank of the work piece from tip to root and back, means for simultaneously feeding the work piece relative to the grinding wheel to cause the locus of contact aforementioned to pass gradually along the width of a tooth and automatic means operatively associated with said oscillating movement producing means for displacing the limits of said oscillating movement relative to the work piece as the feed progresses so as to produce a predetermined departure from the regular tooth form along at least part of the width of the tooth.

18. A gear grinding machine according to claim 17 further comprising means operatively associated with said oscillating-movement-producing-means for modifying said oscillating movement to produce a predetermined departure from the tooth form along at least part of the tooth between the root and tip.

References Cited in the file of this patent

UNITED STATES PATENTS

| | | |
|---|---|---|
| 2,392,819 | Gruenberg et al. | Jan. 15, 1946 |
| 2,404,573 | Graf | July 23, 1946 |
| 2,486,020 | Graf | Oct. 25, 1949 |